J. LYNN.
TRANSMISSION CHAIN OR BELT.
APPLICATION FILED AUG. 26, 1916.

1,243,537.

Patented Oct. 16, 1917.

WITNESSES
H. T. Walker

INVENTOR
John Lynn
BY
ATTORNEYS

UNITED STATES PATENT OFFICE.

JOHN LYNN, OF ALICE, TEXAS.

TRANSMISSION CHAIN OR BELT.

1,243,537.   Specification of Letters Patent.   Patented Oct. 16, 1917.

Application filed August 26, 1916. Serial No. 116,973.

*To all whom it may concern:*

Be it known that I, JOHN LYNN, a citizen of the United States, and a resident of Alice, in the county of Jim Wells and State of Texas, have invented a new and Improved Transmission Chain or Belt, of which the following is a full, clear, and exact description.

My present invention relates more particularly to the chain forming the subject matter of United States Letters Patent, granted to me May 30th, 1916, No. 1,185,336, the principle of which is that resilient elements provided on the chain links are adapted to have an elastic yielding contact with the surface of the drive and driven pulleys, whereby to maintain a constant pressure for effective driving, and be automatically maintained taut, while having great flexibility. The invention is especially useful as a substitute for leather drive belts on automobiles and other machines where the belts are subjected to heat, water, oil, and dirt, which are destructive of the belt and make it at all times difficult to maintain the belt tight on the pulleys.

The present form of my invention is more especially designed for embodiment in a chain or link belt, for use on flat-face pulleys whereas the construction illustrated in my patent above referred to is more particularly adapted for flanged or grooved pulleys.

Reference is to be had to the accompanying drawings forming a part of this specification in which similar reference characters indicate corresponding parts in all the views.

Figure 1:
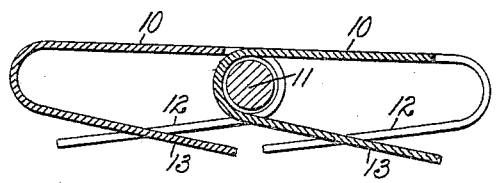
Figure 1 is a longitudinal vertical section of a portion of a transmission chain embodying my invention, the section being taken on the line 1—1, Fig. 2.
Figure 2:
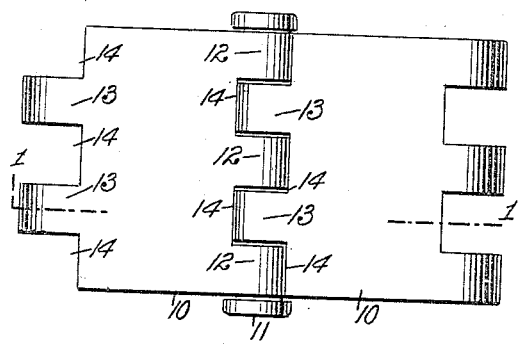
Fig. 2 is a plan view of two connected links.
Figure 3:
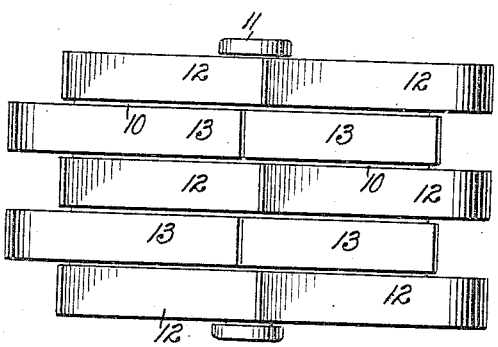
Fig. 3 is an inverted plan view thereof.

In forming a chain in accordance with my invention the same is made up of links 10 having suitable means for pivotally connecting the same, there being shown for the purpose a transverse pin 11 directly uniting adjacent links.

All the links in the chain may be alike, each having fingers formed thereon projecting longitudinally from opposite transverse edges. In the illustrated example, three resilient fingers 12 are produced at one edge and two resilient fingers 13 at the opposite edge. The fingers at the opposite edges are in staggered relation, there being provided alternating with the respective fingers, spaces 14, the spaces at one edge accommodating the fingers of the opposite edge.

Figure 5:
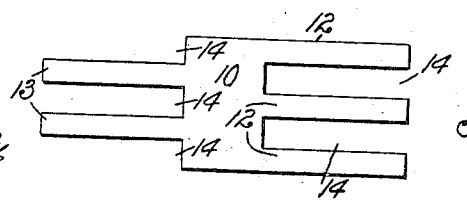
Fig. 5 is a plan view of the blank from which my improved link is formed.

The links are formed from a blank of sheet metal which is shown in Fig. 5, on which several fingers are produced in the plane of the blank. The fingers are then turned under as shown best in Fig. 1. The links are thus given bends to accommodate the connecting pin 11, the bend preferably being in the fingers adjacent to the bases thereof.

Figure 4:
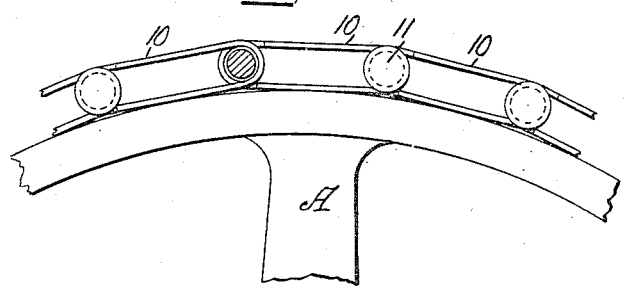
Fig. 4 is a fragmentary side elevation partly in section showing the position of the chain links on the pulley.

With the fingers bent at the under side they will be disposed at an angle to the body of the plate so as to be capable of flexure toward a plane parallel with the body of the plate. The resilient fingers form a contact surface with a pulley A as indicated in Fig. 4, and in passing about the pulley in contact with the periphery thereof, the driving strains will press the resilient fingers with more or less force against the pulley, thereby maintaining the chain taut at all times and thus increasing and making uniform the driving power of the belt. It will be seen that the bent fingers are disposed longitudinally of the belt, the fingers at one end being in the direction of traveling while the fingers at the opposite end are reversely disposed. The alternating fingers of a link form practically a complete surface at the inner side of the link and the corresponding fingers of adjacent links are similarly disposed and the terminal of one finger overlaps or is adjacent to the base of the corresponding finger of the next link so that throughout the belt a substantial resilient contact is effected with the pulleys.

It is to be understood that in practice the links are made of spring steel or other resilient metal.

Having thus described my invention I claim as new, and desire to secure by Letters Patent:

1. A transmission chain including a plurality of links provided with spring fingers thereon to give a flexible yielding contact with surfaces of driving and driven members, the said fingers being disposed at the inner face of the chain within the side edges thereof to constitute the working face of the chain against the drive and driven members, said fingers being disposed lengthwise with respect to the chain links to flex radially relatively to a pulley.

2. A transmission chain including a plurality of connected links provided with resilient fingers disposed longitudinally at the inner side of the chain to constitute the working face thereof, and transverse pins to which the fingers are secured at one end thereof, the said fingers extending lengthwise of the chain so that the free ends thereof will flex toward and from the inner side of the chain links.

3. A transmission chain including a plurality of connected links, each link presenting a body portion and spring fingers at the opposite transverse edges thereof and oppositely disposed at the inner side of the link, the fingers on the respective edges being in staggered relation.

4. A transmission chain including a plurality of connected links, each link presenting a body portion and spring fingers at the opposite transverse edges thereof and oppositely disposed at the inner side of the link, the fingers on the respective edges being in staggered relation, the oppositely disposed fingers of a link crossing each other at angles to the plane of the body of the link.

5. A transmission chain comprising a plurality of links provided with spring fingers integral therewith at opposite transverse edges, the fingers being return bent at the inner side of the links, and transverse pins passing through the adjacent bends of adjacent links, the fingers on the same link being in staggered relation so that the fingers at one edge are received between the fingers at the opposite edge.

6. A transmission chain comprising a plurality of links provided with spring fingers integral therewith at opposite transverse edges, the fingers being return bent at the inner side of the links, and transverse pins passing through the adjacent bends of adjacent links, the fingers on the same link being in staggered relation so that the fingers at one edge are received between the fingers at the opposite edge, the corresponding fingers on adjacent links being disposed in parallel inclined planes, and the terminals of the said parallel inclined fingers on one link alining and terminating adjacent to the bases of the corresponding fingers of the adjacent link.

JOHN LYNN.

Witnesses:
H. G. ELMORE,
JOHN LIPS.

Copies of this patent may be obtained for five cents each, by addressing the "Commissioner of Patents, Washington, D. C."